(12) United States Patent
Klonoski et al.

(10) Patent No.: US 10,932,148 B2
(45) Date of Patent: *Feb. 23, 2021

(54) APPARATUS, SYSTEM AND METHOD FOR TESTING OF COMMUNICATION NETWORKS WITH PRESCRIBED COMMUNICATION TRAFFIC

(71) Applicant: DC MOBILITY HOLDINGS, LLC, Vienna, VA (US)

(72) Inventors: Nathan Klonoski, Alexandria, VA (US); Arsalan Mehmood, Arlington, VA (US); Richard Canning, Rockville, MD (US); Kamlesh Lele, Reston, VA (US); Andrew P. Caplan, McLean, VA (US)

(73) Assignee: DC Mobility Holdings, LLC, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,316

(22) Filed: Mar. 29, 2019

(65) Prior Publication Data

US 2019/0230538 A1 Jul. 25, 2019

Related U.S. Application Data

(63) Continuation of application No. 15/245,603, filed on Aug. 24, 2016, now Pat. No. 10,285,084.

(60) Provisional application No. 62/267,578, filed on Dec. 15, 2015.

(51) Int. Cl.
*H04W 24/08* (2009.01)
*H04L 12/26* (2006.01)

(52) U.S. Cl.
CPC .......... *H04W 24/08* (2013.01); *H04L 43/062* (2013.01); *H04L 43/08* (2013.01); *H04L 43/0876* (2013.01); *H04L 43/50* (2013.01)

(58) Field of Classification Search
CPC .... H04W 24/08; H04L 43/08; H04L 43/0876; H04L 43/062; H04L 43/50
See application file for complete search history.

(56) References Cited

U.S. PATENT DOCUMENTS 5,049,873 A 9/1991 Robins et al.
6,061,725 A * 5/2000 Schwaller ............... H04L 43/50
370/230

(Continued)

OTHER PUBLICATIONS

International Search Report and Written Opinion of corresponding International Application No. PCT/US2016/065629 dated Mar. 23, 2017, all enclosed pages cited.

*Primary Examiner* — Tejis Daya
(74) *Attorney, Agent, or Firm* — Burr & Forman, LLP

(57) ABSTRACT

A load test system may include a plurality of remote nodes, a network test controller and a command and control path. Each of the remote nodes may be associated with a corresponding remote user terminal of a plurality of user terminals. The command and control path may operably couple the network test controller to the remote nodes via a communication network under test. The network test controller comprises processing circuitry configured to provide command and control of the remote nodes to generate prescribed communication traffic to load the communication network under test, and monitor a status of network traffic.

20 Claims, 3 Drawing Sheets

(56) References Cited

U.S. PATENT DOCUMENTS

| | | | |
|---|---|---|---|
| 6,112,015 A * | 8/2000 | Planas | H04L 41/22 709/220 |
| 6,625,648 B1 | 9/2003 | Schwaller et al. | |
| 6,789,117 B1 | 9/2004 | Joiner et al. | |
| 7,231,210 B1 | 6/2007 | Croak et al. | |
| 7,401,259 B2 * | 7/2008 | Bhowmik | G06F 11/2294 714/31 |
| 9,042,402 B1 | 5/2015 | Loganathan et al. | |
| 9,237,067 B1 | 1/2016 | Chhabra | |
| 9,479,219 B1 | 10/2016 | Gandham et al. | |
| 9,529,684 B2 | 12/2016 | Sincan et al. | |
| 9,705,769 B1 | 7/2017 | Sarangapani et al. | |
| 2003/0098879 A1 * | 5/2003 | Mathews | G06F 11/3688 715/762 |
| 2004/0236866 A1 * | 11/2004 | Dugatkin | H04L 41/00 709/235 |
| 2005/0108444 A1 | 5/2005 | Flauaus et al. | |
| 2009/0143020 A1 | 6/2009 | Kotabe et al. | |
| 2009/0279673 A1 | 11/2009 | Maffre et al. | |
| 2010/0020696 A1 | 1/2010 | Tung | |
| 2010/0034100 A1 | 2/2010 | Beyers | |
| 2011/0261831 A1 | 10/2011 | Sharma et al. | |
| 2013/0103821 A1 | 4/2013 | Gonia | |
| 2013/0132774 A1 | 5/2013 | Somendra | |
| 2014/0087716 A1 * | 3/2014 | Vaderna | H04W 24/08 455/422.1 |
| 2015/0295802 A1 | 10/2015 | Balakrishnan et al. | |
| 2016/0308758 A1 | 10/2016 | Li et al. | |
| 2017/0078183 A1 | 3/2017 | Civanlar et al. | |
| 2017/0155569 A1 * | 6/2017 | Chinnaswamy | H04L 41/12 |
| 2017/0214623 A1 | 7/2017 | Finkelstein | |

* cited by examiner

APPARATUS, SYSTEM AND METHOD FOR TESTING OF COMMUNICATION NETWORKS WITH PRESCRIBED COMMUNICATION TRAFFIC

CROSS-REFERENCE TO RELATED APPLICATIONS

This application is a continuation of U.S. application Ser. No. 15/245,603 filed Aug. 24, 2016, which claims the benefit of U.S. Provisional Application No. 62/267,578 filed on Dec. 15, 2015, the entire contents of which are hereby incorporated herein by reference.

TECHNICAL FIELD

Various example embodiments relate generally to the provision of communication network testing, and more specifically relate to provision of such testing in a robust manner that is both repeatable and controllable.

BACKGROUND

Standard communications network testing involves validating that commercial devices work on the network equipment and then injecting large amounts of simulated traffic into the network to validate the networks ability to handle load. Because user network traffic does not follow the simulated traffic patterns and is generated from a variety of user devices, there is potential for this real world traffic to create untested conditions that lead to equipment or service failure. In addition, simulated traffic systems do not use the air interface (in case of a wireless system) for traffic injection, and so the full Radio Frequency Air Interface (AI) is typically not tested in a loaded fashion unless a large number of users are assembled for testing, which is difficult to repeat and control.

BRIEF SUMMARY OF SOME EXAMPLES

Some example embodiments may provide an ability to address the above identified issues by creating a system that controls a large number of devices to allow simulated real world traffic injection in a controllable and reproducible fashion. In this regard, for example, some embodiments may provide a central control point, which controls a large number of remote control points. The central control point (or central hub (CH)) and the remote control points (or remote nodes (RN)) coordinate to provide command and control of communications devices and network traffic as well as status of the network traffic.

In an example embodiment, a load test system is provided. The load test system may include a plurality of remote nodes, a network test controller and a command and control path. Each of the remote nodes may be associated with a corresponding remote user terminal of a plurality of user terminals. The command and control path may operably couple the network test controller to the remote nodes via a communication network under test. The network test controller comprises processing circuitry configured to provide command and control of the remote nodes to generate prescribed communication traffic to load the communication network under test, and monitor a status of network traffic.

In another example embodiment, a network test controller is provided. The network test controller is configured to provide load testing of a system comprising a command and control path and a plurality of remote nodes. Each of the remote nodes may be associated with a corresponding remote user terminal of a plurality of user terminals. The command and control path may operably couple the network test controller to the remote nodes via a communication network under test. The network test controller may include processing circuitry configured to provide command and control of the remote nodes to generate prescribed communication traffic to load the communication network under test, and monitor a status of network traffic.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
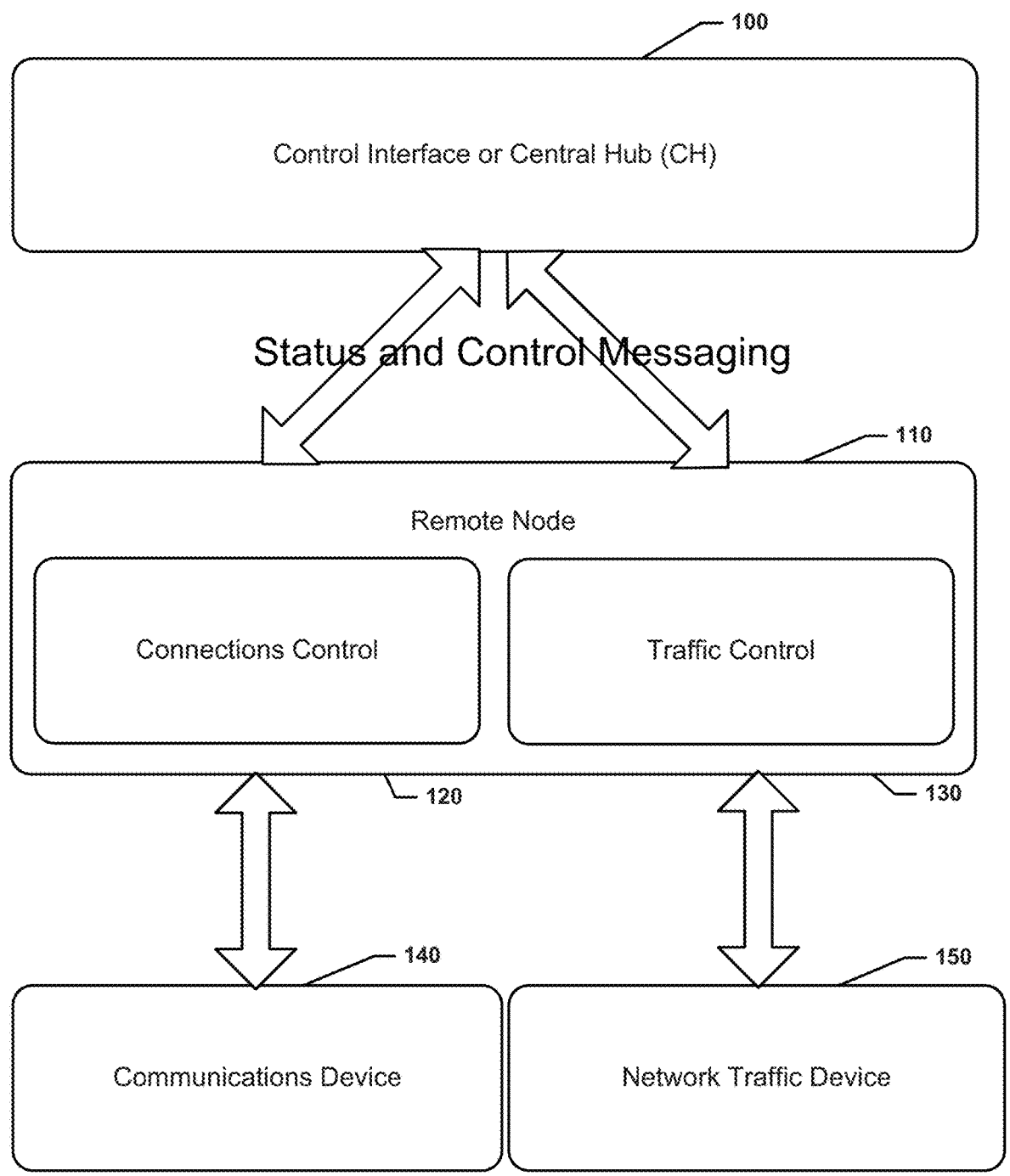
FIG. 1 illustrates a conceptual diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As used in herein, the terms "component," "module," "engine" and the like are intended to include a computer-related entity, such as but not limited to hardware, firmware, or a combination of hardware and software. For example, a component, engine or module may be, but is not limited to being, a process running on a processor, a processor, an object, an executable, a thread of execution, and/or a computer. By way of example, both an application running on a computing device and/or the computing device can be a component, engine or module. One or more components, engines or modules can reside within a process and/or thread of execution and a component/engine/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/engine/module in a local system, distributed system, and/or across a network such as the Internet with other systems by way of the signal. Each respective component/engine/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/engines/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

FIG. 1 illustrates a conceptual diagram of a system according to an example embodiment. As shown in FIG. 1, the system may include a control interface such as the CH 100, one or more remote nodes 110 for which connections control 120 and traffic control 130 services are provided with respect to one or more communication devices 140 and network traffic devices 150.

The CH 100 provides an interface to the system user/tester to control the connections and services active on the network communications devices. Generally, this includes control of power up and power down, attaching to or detaching from the network, specification of connection parameters including Quality of Service (QOS) and power up/power down of the transmitter. The CH 100 also allows parameters to be entered controlling network traffic flow and for traffic flows to be started, paused and stopped. These traffic flows include native network capabilities including voice calls, SMS, and MMS as well as data calls including ping, FTP, web browsing, iPerf amongst others. These capabilities allow for a customization of the traffic generated by real users on the communications network.

The CH 100 provides a single point of control that controls many devices through its connections to the RNs 110 of the system. A single CH is able to take a single user command and replicate it so that all attached RNs perform the commanded action at the same time.

The CH 100 will display the status of the RN 110 and associated communications devices 140. These statuses will include state of the communications device including power state, service state, etc. as well as the state of the traffic generating services and metrics including network signal level and quality, network serving entity information and throughputs, packet loss, etc. as appropriate to the services in test.

The CH 100 displays to the user the connection status to each RN 110 as well as the status information of network connection and traffic flows on the RN. The CH 100 provides a simplified interface to allow for at a glance determination of status of many to hundreds of RNs 110 as well as the ability to provide detailed status information for a particular RN.

The CH 100 will log the status and connection information received for each of the RNs 110 to a distinct logging path to enable data analysis of test execution and a per RN basis. The CH 100 will also accumulate the total system metrics and save these results to a log file.

A RN 110 denotes the combination of communications device 140 and a computing entity. The RN 110 controls both communications device functions as well as traffic generation. It is responsible for controlling a wide assortment of devices and providing the necessary control to generate the services requested by the CH 100. The RN 110 is capable of generating all of the traffic types noted for CH 100 and providing status and metrics on the traffic for display at the CH 100, as described above.

RN configuration will change based on the particular network device used in the test. For modern smartphones, the RN to CH control connection, the traffic control mechanism, and the network connection control may all be located on the communication device 140. For other terminals, the RN to CH connection and traffic control may be on a computer attached to the network device to control that device's network connection and transmit data through the device.

Between the CH 100 and RN 110, an abstracted interface allows for the transfer of command and status information. This interface will provide basic configuration and control messages which the RN 110 must fulfill by providing the network device specific control mechanisms which may include attention (AT) commands, software commands, electronic signaling or physical inputs as required. The abstracted interface will also provide a means for the RN 110 to communicate status and metrics information for network connections and traffic flows.

The abstracted interface nominally occurs using Internet Protocol (IP), but the information exchanged is simple text primitives that could be input via a variety of mechanisms including file transfer. The abstracted interface enables the command and control path to be separated from the network under test.

In order to provide maximum benefit, the system allows for repeatable testing. The CH 100 can record scripts of services and traffic that comprise a test and save these to files. These scripts can be reloaded and executed as desired. A user/tester can design and build scripts to mimic any traffic pattern in the communications network. The scripting engine executes based on the ability to synchronize devices to a given test start time and then perform actions at a given offset from this start time. Using the abstracted interface, start and stop times for traffic and network connections as well as execution for a given number of times are given. This information is taken from the user using the CH 100 user interface, compiled, and transmitted to the RNs 110. Once transmitted, the RNs 110 will retain the requested services and perform the actions at the given time. Status information is transmitted by the RNs 110 back to the CH 100 normally during script execution. However, it is also possible for the RNs 110 to store status information locally, and then provide such information to the CH 100 for post hoc analysis.

The system may be nominally designed with each RN 110 providing a TCP server to which the CH 100 connects in order to transfer command and status information. This path is typically configured to be a private IP network to prevent command and status traffic from impacting the test results. As necessary, the system can use the communication path under test, connecting to a network device over the network under test.

The ability to use the network under test as a communication path allows RNs 110 to be placed into a communications network as a probe. The purpose of the probe is to periodically enable traffic and to report back on network health over time including signal strength, observed serving network entities, the traffic path and the ability to obtain service. The services, status and control capabilities of the system are ideally suited to satisfy this need as well.

Figure 2:
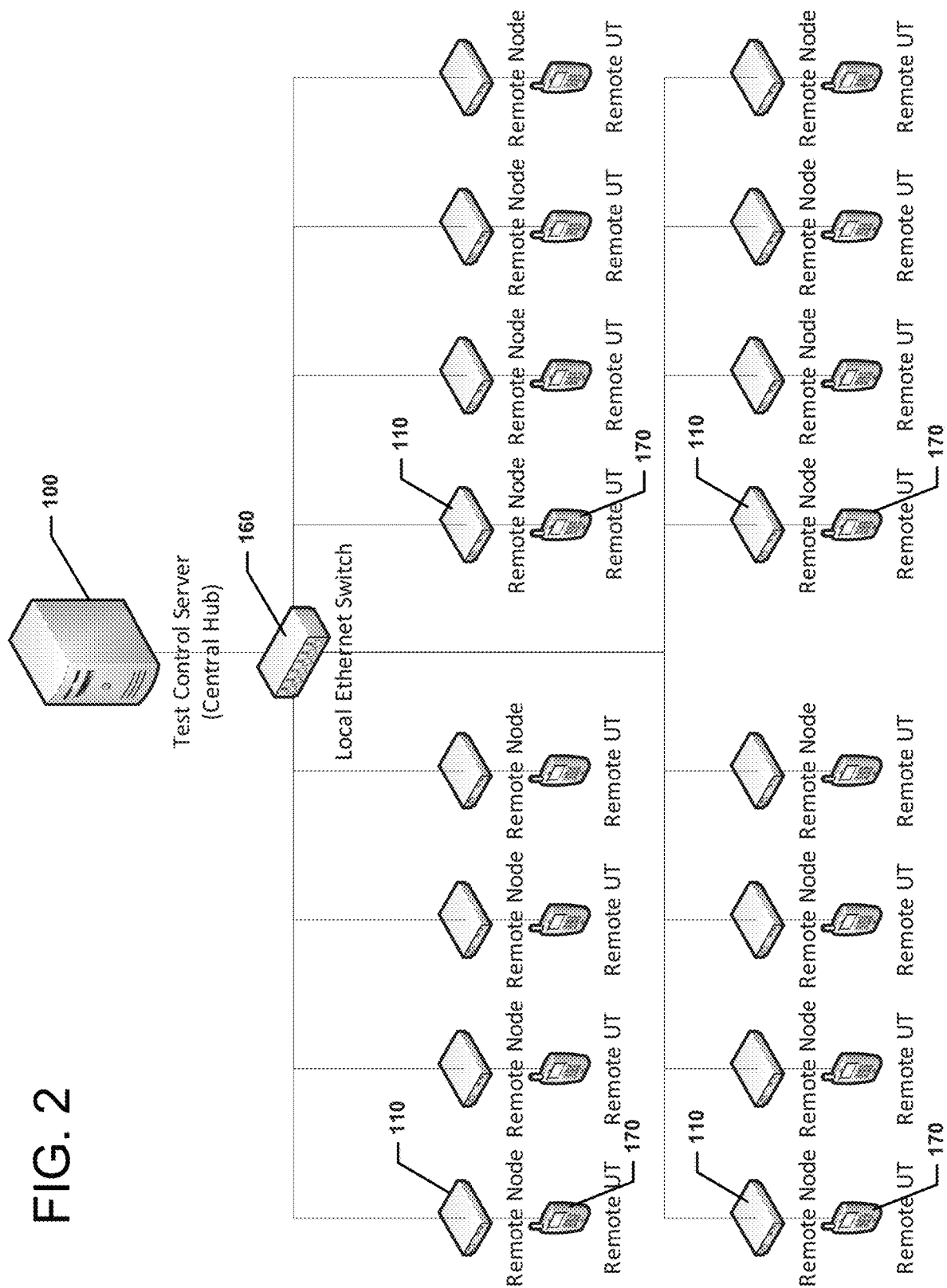
FIG. 2 illustrates a block diagram of a system in accordance with an example embodiment.

FIG. 2 illustrates a block diagram of a system in accordance with an example embodiment. As shown in FIG. 2, the CH 100 may act as a single controller for a plurality of RNs 110. The CH 100 may be isolated from the network under test via a local Ethernet switch 160. The RNs 110 may be operably coupled to respective remote user terminals 170, as shown in FIG. 2. The local Ethernet switch 160 may define the control plane, and serve to isolate the network under test from the CH 100.

As discussed above, the CH 100 may provide the system with the capability to script interactions with the remote user terminals 170 under conditions controllable and/or predefinable by the CH 100. This allows the CH 100 to act as a central control node, enabling a single language to be used to interact with all of the RNs 110 and the remote user terminals 170. The CH 100 is therefore operating out at the edge of the network under test in order to interact with the RNs 110 to generate real network traffic of the desired type and having the desired characteristics to provide a full and realistic testing capability for the network under test.

Figure 3:
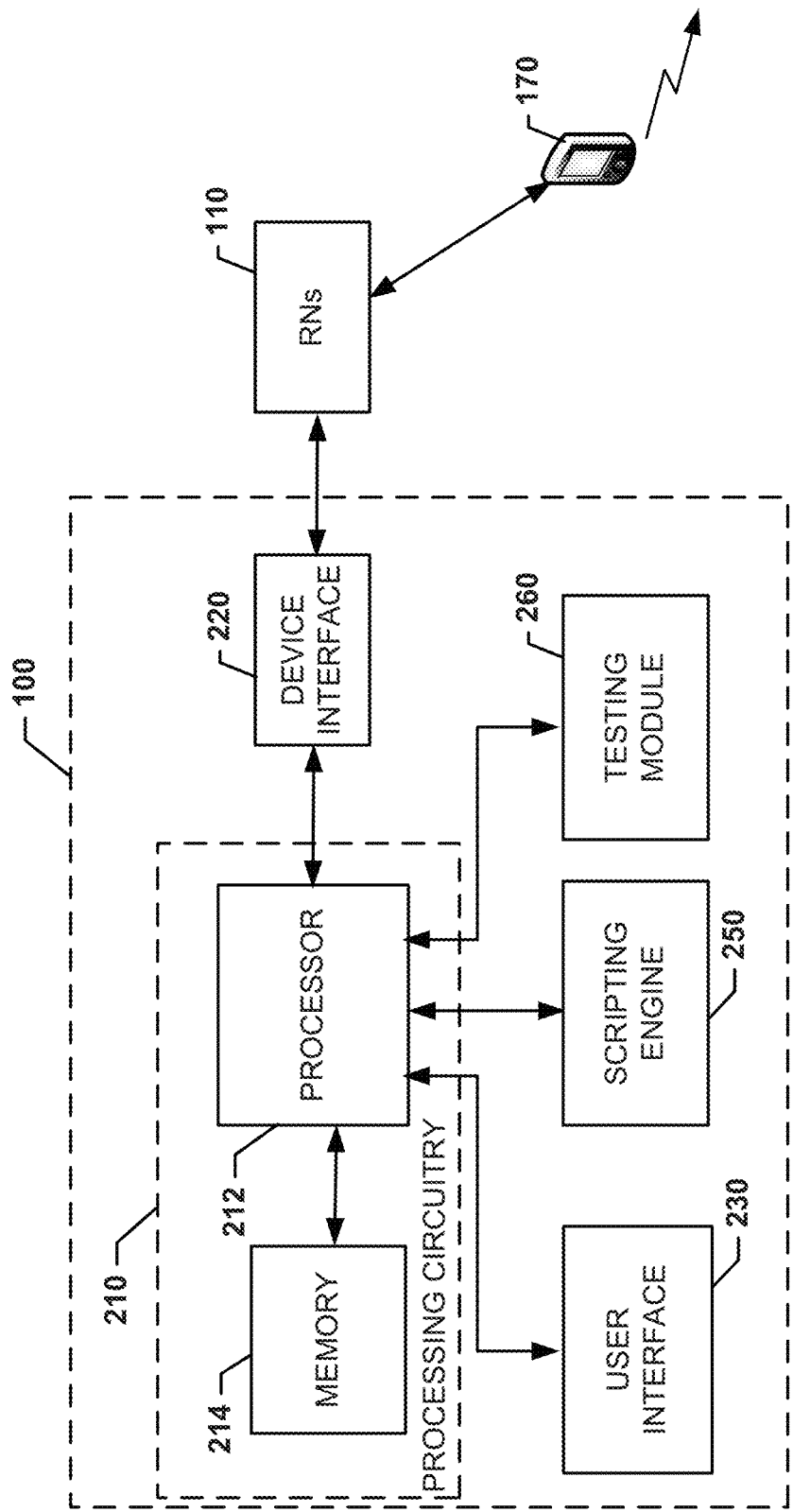
FIG. 3 illustrates a block diagram of a central hub according to an example embodiment.

FIG. 3 illustrates a block diagram of a central hub (i.e., CH 100) according to an example embodiment. In this regard, the CH 100 may include processing circuitry 210 that may be configured to interface with, control or otherwise coordinate the operations of various components or modules described herein in connection with executing load testing as described herein. The CH 100 may utilize the processing circuitry 210 to provide electronic control inputs to one or more functional units of the CH 100 to receive, transmit and/or process data associated with the one or more functional units and perform communications necessary to enable the ability to control operations of the RNs 100 and script scenarios for network testing as described herein.

In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and a user interface 230. As such, the processing circuitry 210 may be embodied as a circuit chip (e.g., an integrated circuit chip) configured (e.g., with hardware, software or a combination of hardware and software) to perform operations described herein.

The device interface 220 may include one or more interface mechanisms for enabling communication with other devices (e.g., the RNs 110, and/or other devices). In some cases, the device interface 220 may be any means such as a device or circuitry embodied in either hardware, or a combination of hardware and software that is configured to receive and/or transmit data from/to devices or components in communication with the processing circuitry 210 via internal and/or external communication mechanisms. Accordingly, for example, the device interface 220 may further include wired and/or wireless communication equipment (e.g., one or more antennas) for at least communicating with the RNs 110, and/or the modules described herein. In some cases, the device interface 220 may therefore include one or more antenna arrays that may be configured or configurable to receive and/or transmit properly formatted signals associated with communications with the RNs 110. The device interface 220 may further include radio circuitry configured to encode and/or decode, modulate and/or demodulate, or otherwise process wireless signals received by or to be transmitted by the antenna array(s).

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein in reference to execution of an example embodiment.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 may be configured to buffer input data for processing by the processor 212. Additionally or alternatively, the memory 214 may be configured to store instructions for execution by the processor 212. As yet another alternative or additional capability, the memory 214 may include one or more databases that may store a variety of data sets or tables useful for operation of the modules described below and/or the processing circuitry 210. Among the contents of the memory 214, applications or instruction sets may be stored for execution by the processor 212 in order to carry out the functionality associated with each respective application or instruction set. In some cases, the applications/instruction sets may include instructions for carrying out some or all of the operations associated with load testing as described herein.

As shown in FIG. 3, the CH100 may further include (or otherwise be operably coupled to) a scripting engine 250 and/or a testing module 260. In some examples, the processor 212 (or the processing circuitry 210) may be embodied as, include or otherwise control various modules (e.g., the scripting engine 250 and/or the testing module 260) that are configured to perform respective different tasks associated with the CH 100. As such, in some embodiments, the processor 212 (or the processing circuitry 210) may be said to cause each of the operations described in connection with the various modules described herein. However, it should be appreciated that the modules could be remotely located from the processing circuitry 210 in some cases and may therefore employ their own processing circuitry in such cases.

The scripting engine 250 may be any means such as a device or circuitry embodied in either hardware, or a combination of hardware and software that is configured to receive scripting information to define a testing scenario, or to record testing information as a testing scenario. Thus, for example, the scripting engine 250 may be configured to receive user defined parameters to define a scenario including a start time for the RNs 110 to begin generating a selected type of network traffic and a predefined amount of the network traffic. A stop time may also be defined. Moreover, in some cases, the scripting engine 250 may define multiple start and stop times for corresponding selected sets of the RNs 110 to generate respective different types of network traffic. Thus, for example, different groups of RNs 110 can simultaneously and/or sequentially define different types of network traffic so that robust testing of the network under test can be defined by a script generated by the scripting engine 250. Meanwhile, the RNs 110 may also report status information to the CH 100 so that the CH 100 can monitor the performance of the network in real time. The details of the scenario can be recorded from the perspective of which commands and actions defined the scenario. Moreover, in cases in which the scenario is modified, details of the modification can also be recorded as a new, modified scenario.

The testing module 260 may be any means such as a device or circuitry embodied in either hardware, or a combination of hardware and software that is configured to receive information indicative of the parameters that are to be employed by the RNs 110 for a test, and to provide such information to the RNs 110 to direct their operation accordingly. Thus, for example, the testing module 260 may interface with the scripting module 250 to receive the "script" defining the command and control details that define the testing scenario. The testing module 260 may then interface with the RNs 110 to provide the command and control instructions that cause the script to be executed. The testing module 260 can also interface with the RNs 110 to monitor the status and results of the testing and, in some cases, record the same for analysis.

Accordingly, based on the descriptions above, a load test system may be provided in accordance with an example embodiment. The system may include a plurality of remote nodes, a network test controller and a command and control path. Each of the remote nodes may be associated with a corresponding remote user terminal of a plurality of user terminals. The command and control path may operably couple the network test controller to the remote nodes via a communication network under test. The network test controller comprises processing circuitry configured to provide command and control of the remote nodes to generate prescribed communication traffic to load the communication network under test, and monitor a status of network traffic.

In some cases, the system may be optionally modified, augmented or enhanced in various ways. For example, in some cases, the network test controller may be configured to receive information indicative of a selected type of network traffic and a predefined amount of network traffic to define the prescribed communication traffic. In such an example, the network test controller may be configured to direct the remote nodes to generate the predefined amount of network traffic and the selected type of network traffic while the network test controller monitors the status of network traffic. Additionally or alternatively, the network test controller may be configured to receive information indicative of a first selected type of network traffic and a first predefined amount of network traffic, and a second selected type of network traffic and a second predefined amount of network traffic to define the prescribed communication traffic. In such an example, the network test controller may direct a first subset of the remote nodes to generate the first predefined amount of network traffic and the first selected type of network traffic and direct a second subset of the remote nodes to generate the second predefined amount of network traffic and the second selected type of network traffic while the network test controller monitors the status of network traffic. The first and second selected types of network traffic may be different from each other. Additionally or alternatively, at least one of the user terminals may be embodied as a corresponding at least one of the remote nodes. Additionally or alternatively, the network test controller may be configured to display status information for each of the remote nodes and the user terminals. Additionally or alternatively, the status information may include a power state, service state, connection status of remote nodes, and/or metrics indicative of performance aspects of the communication network under test. Additionally or alternatively, the network test controller may be configured to log the status information for analysis. Additionally or alternatively, the communication network under test may be a wireless network, and the prescribed communication traffic may be generated to be transmitted over the wireless network. Additionally or alternatively, the network test controller may include a scripting engine configured to receive scripting information to define a testing scenario, or to record testing information as the testing scenario. In such an example, the scripting information may define the prescribed communication traffic as a predefined amount of network traffic and a selected type of network traffic. In some cases, the testing information may include information indicative of the status of network traffic responsive to the predefined amount of network traffic and the selected type of network traffic. In some examples, the selected type of network traffic may include data traffic, text message traffic, multimedia message traffic, voice traffic, or file transfer protocol traffic generated by the user terminals responsive to the command and control initiated by the network test controller. In some cases, the scripting information may define temporal parameters associated with a period during which the predefined amount of network traffic and the selected type of network traffic are to be generated. Additionally or alternatively, the network test controller may be configured to define quality of service communication parameters or power level parameters for defining the prescribed communication traffic. Additionally or alternatively, the network test controller may be configured to be inserted into the communication network under test as a network probe. The network probe may be selectively enabled to generate the prescribed communication traffic or monitor the status of network traffic at selected times and in accordance with selected communication parameters. Additionally or alternatively, the command and control path may be separate from the communication network under test. Additionally or alternatively, the command and control path is a local Ethernet switch.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the That which is claimed:

1. A load test system comprising:
a plurality of remote nodes, each of the remote nodes being associated with a corresponding remote user terminal of a plurality of user terminals;
a network test controller; and
a command and control path operably coupling the network test controller to the remote nodes via a communication network under test,
wherein the network test controller comprises processing circuitry configured to provide command and control of the remote nodes to generate prescribed communication traffic to load the communication network under test, and monitor a status of network traffic,
wherein the network test controller comprises a scripting engine configured to receive scripting information to define a testing scenario, the testing scenario defining at least a traffic type and a traffic amount to be employed during the testing scenario, and
wherein the scripting engine is configured to record testing information including modifications to a prior testing scenario as the testing scenario.

2. The load test system of claim 1, wherein the traffic type and the traffic amount includes at least a first selected type of network traffic and a first predefined amount of network traffic, and a second selected type of network traffic and a second predefined amount of network traffic to define the prescribed communication traffic.

3. The load test system of claim 2, wherein the network test controller directs a first subset of the remote nodes to generate the first predefined amount of network traffic and the first selected type of network traffic and directs a second subset of the remote nodes to generate the second predefined amount of network traffic and the second selected type of network traffic while the network test controller monitors the status of network traffic.

4. The load test system of claim 1, wherein at least one of the user terminals is embodied as a corresponding at least one of the remote nodes.

5. The load test system of claim 1, wherein the network test controller is configured to display status information for each of the remote nodes and the user terminals.

6. The load test system of claim 5, wherein the status information comprises a power state, service state, connection status of remote nodes, or metrics indicative of performance aspects of the communication network under test.

7. The load test system of claim 5, wherein the network test controller is configured to log the status information for analysis.

8. The load test system of claim 1, wherein the communication network under test is a wireless network, and the prescribed communication traffic is generated to be transmitted over the wireless network.

9. The load test system of claim 2, wherein the scripting engine is configured to receive the scripting information by recording testing information associated with a current test as the testing scenario.

10. The load test system of claim 9, wherein the scripting information defines the prescribed communication traffic as the first and second predefined amounts of network traffic and the first and second selected types of network traffic.

11. The load test system of claim 10, wherein the testing information comprises information indicative of the status of network traffic responsive to the first and second predefined amounts of network traffic and the first and second selected types of network traffic.

12. The load test system of claim 11, wherein the first and second selected types of network traffic comprises data traffic, text message traffic, multimedia message traffic, voice traffic, or file transfer protocol traffic generated by the user terminals responsive to the command and control initiated by the network test controller.

13. The load test system of claim 10, wherein the scripting information defines temporal parameters associated with a period during which the first and second predefined amounts of network traffic and the first and second selected types of network traffic are to be generated.

14. A load test system comprising:
a plurality of remote nodes, each of the remote nodes being associated with a corresponding remote user terminal of a plurality of user terminals;
a network test controller; and
a command and control path operably coupling the network test controller to the remote nodes via a communication network under test,
wherein the network test controller comprises processing circuitry configured to provide command and control of the remote nodes to generate prescribed communication traffic to load the communication network under test, and monitor a status of network traffic,
wherein the network test controller comprises a scripting engine configured to receive scripting information to define a testing scenario, the testing scenario defining at least a traffic type and a traffic amount to be employed during the testing scenario, or to record testing information as the testing scenario, and
wherein the scripting engine is configured to synchronize operation of the remote nodes to a given test start time.

15. The load test system of claim 14, wherein the scripting engine is further configured to script performance of actions by the remote nodes at a given offset from the given test start time.

16. A load test system comprising:
a plurality of remote nodes, each of the remote nodes being associated with a corresponding remote user terminal of a plurality of user terminals;
a network test controller; and
a command and control path operably coupling the network test controller to the remote nodes via a communication network under test,
wherein the network test controller comprises processing circuitry configured to provide command and control of the remote nodes to generate prescribed communication traffic to load the communication network under test, and monitor a status of network traffic, wherein the network test controller comprises a scripting engine configured to receive scripting information to define a testing scenario, the testing scenario defining at least a traffic type and a traffic amount to be employed during the testing scenario, or to record testing information as the testing scenario, and wherein the scripting engine is configured to define start and stop times for the remote nodes to generate the traffic type and the traffic amount for a first scenario, and to define a given number of times to execute the first scenario.

17. The load test system of claim 1, wherein the network test controller is configured to define quality of service communication parameters or power level parameters for defining the prescribed communication traffic.

18. The load test system of claim 1, wherein the network test controller is configured to be inserted into the communication network under test as a network probe, the network probe being selectively enabled to generate the prescribed communication traffic or monitor the status of network traffic at selected times and in accordance with selected communication parameters.

19. The load test system of claim 1, wherein the command and control path is separate from the communication network under test.

20. The load test system of claim 1, wherein the command and control path is a local Ethernet switch.

* * * * *